(12) United States Patent
Padiyath et al.

(10) Patent No.: US 11,935,261 B2
(45) Date of Patent: Mar. 19, 2024

(54) DETERMINING DIMENSIONS FOR PROVIDING A PRECUT WINDOW FILM

(71) Applicant: 3M INNOVATIVE PROPERTIES COMPANY, St. Paul, MN (US)

(72) Inventors: Raghunath Padiyath, Woodbury, MN (US); Viruru Phaniraj, Woodbury, MN (US); Jeffrey P. Adolf, Rochester, MN (US); Steven P. Floeder, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 562 days.

(21) Appl. No.: 17/052,706

(22) PCT Filed: May 8, 2019

(86) PCT No.: PCT/IB2019/053784
§ 371 (c)(1),
(2) Date: Nov. 3, 2020

(87) PCT Pub. No.: WO2019/215638
PCT Pub. Date: Nov. 14, 2019

(65) Prior Publication Data
US 2021/0110563 A1  Apr. 15, 2021

Related U.S. Application Data

(60) Provisional application No. 62/668,981, filed on May 9, 2018.

(51) Int. Cl.
*G06T 7/62* (2017.01)
*G01B 11/03* (2006.01)
(Continued)

(52) U.S. Cl.
CPC ............. *G06T 7/62* (2017.01); *G01B 11/03* (2013.01); *G06T 7/73* (2017.01); *H04Q 9/00* (2013.01);
(Continued)

(58) Field of Classification Search
CPC ... G06T 7/62; G06T 7/73; G06T 2207/30204; G01B 11/03; G01B 11/02; H04Q 9/00; E06B 9/24; G08C 17/02
(Continued)

(56) References Cited

U.S. PATENT DOCUMENTS 5,432,744 A   7/1995 Nagata
7,293,368 B1  11/2007 Faulk
(Continued)

FOREIGN PATENT DOCUMENTS

CN   105094838   * 11/2015
CN   104751093   * 12/2018
(Continued)

OTHER PUBLICATIONS

Algorithm Overview, 3 pages.
(Continued)

*Primary Examiner* — Jerome Grant, II
(74) *Attorney, Agent, or Firm* — Julie Lapos-Kuchar; Vincent Pham; Daniel Iden

(57) ABSTRACT

A system for measuring dimensions of film to be applied to a window includes a plurality of removable cards for placement on the window, each of the plurality of removable cards having a plurality of visible correspondence points at pre-defined positions on the respective removable card. The system further includes a mobile device having an image capture device, and the image capture device is configured to capture an image of the window having a set of correspondence points visible in the image. Additionally, the
(Continued)

system includes a server configured to receive the image of the window captured by the mobile device and process the image to determine dimensions of a film to be cut for the window based on the set of correspondence points and the pre-defined positions, and processing the image removes perspective distortions in the image. The system is configured to output the dimensions of the film.

7 Claims, 8 Drawing Sheets

(51) Int. Cl.
*G06T 7/73* (2017.01)
*H04Q 9/00* (2006.01)
*E06B 9/24* (2006.01)

(52) U.S. Cl.
CPC ....... *E06B 9/24* (2013.01); *G06T 2207/30204* (2013.01)

(58) Field of Classification Search
USPC .......................................... 382/103
See application file for complete search history.

(56) References Cited

U.S. PATENT DOCUMENTS

| 8,923,650 | B2 | 12/2014 | Wexler |
| 9,489,743 | B2 | 11/2016 | Spector |
| 2007/0098234 | A1 | 5/2007 | Fiala |
| 2010/0035048 | A1 | 2/2010 | Reuter |
| 2011/0056348 | A1 | 3/2011 | Birch |
| 2017/0284799 | A1 | 10/2017 | Wexler |

FOREIGN PATENT DOCUMENTS

| DE | 10161592 | * | 7/2003 | ............. G01V 15/00 |
| JP | 09229633 | | 9/1997 | |
| JP | 2001270682 | * | 10/2001 | |
| JP | 2011220797 | | 11/2011 | |
| JP | 2015227787 | | 12/2015 | |
| WO | WO2021140945 | * | 7/2021 | ............. A45D 44/00 |

OTHER PUBLICATIONS

"Complete Precut Window Tint Kits", [retrieved from the internet on Feb. 20, 2018], URL: <http://www.northerntint.com/complete-precut-window-tint-kits.html>, 2 pages.

"Custom Pre-Cut Residential Kit", [retrieved from the internet on Feb. 20, 2018], URL: <https://www.windowtint.com/products/custom-pre-cut-residential-kit>, 3 pages.

"Detection of ArUco Markers", [retrieved from the internet on Apr. 19, 2018], URL: <https://docs.opencv.org/3.4.0/d5/dae/tutorial_aruco_detection.html>, 13 pages.

"SnapTint Nano Ultra Vision Window Film", [retrieved from the internet on Feb. 20, 2018], URL: <http://www.snaptint.com/product.php?productid=16226>, 4 pages.

"Window Tint Film Rolls", [retrieved from the internet on Feb. 20, 2018], URL: <https://www.lexenauto.com/Window-Tint-s/1838.htm>, 1 page.

"Window Tint Precut Window Films", [retrieved from the internet on Feb. 20, 2018], URL: <https://www.rvinyl.com/Window-Tint.html>, 5 pages.

International Search Report for PCT International Application No. PCT/IB2019/053784, dated Sep. 19, 2019, 3 pages.

* cited by examiner

DETERMINING DIMENSIONS FOR PROVIDING A PRECUT WINDOW FILM

TECHNICAL FIELD

The disclosure relates to image capturing, marker recognition, and processing.

BACKGROUND

Film may be applied to a window surface for several reasons. For example, film applied to the window surface may alter the color and intensity of light passing through the window, affect the temperature of the room containing the window, and change the transparency of the window. In some cases, film may strengthen a window, preventing the window from shattering if struck. Additionally, window film may attenuate ultraviolet light, or prevent ultraviolet light from passing through the window. A user may cut a sheet of window film to a custom size for the dimensions of the window.

SUMMARY

In general, this disclosure describes techniques for automatically determining window dimensions to enable cutting a sheet of window film to an accurate custom size for the dimensions of the window. For example, one or more processors may determine the dimensions of the window based on locations of identifiable objects within an image of the window. Film to be installed on a surface of the window is precut according to the calculated window dimensions. Image processing techniques of this disclosure may identify and differentiate objects located in an image. For example, a plurality of cards affixed to the window may each include a plurality of reference markers. A mobile device may capture an image of a window having the plurality of cards placed on the window. One or more processors may be configured to receive data indicative of the image, identify locations of the plurality of reference markers on the plurality of cards, and determine the dimensions of the window and film based on the locations of the plurality of reference markers.

In one example, a system for determining dimensions of a film to be applied to a window includes a plurality of removable cards for placement on the window, each of the plurality of removable cards having a plurality of visible correspondence points at pre-defined positions on the respective removable card. The system further includes a mobile device having an image capture device, wherein the image capture device is configured to capture an image of the window and at least a subset of the plurality of removable cards placed on the window, wherein the subset of removable cards captured in the image have a set of correspondence points visible in the image, and a server. The server of the exemplary system is configured to detect a set of locations of each of the set of correspondence points visible in the image, calculate dimensions of the window based on the set of locations and the pre-defined positions of the correspondence points on the respective removable cards, wherein calculating the dimensions removes perspective distortions in the image, and output information indicative of the dimensions of the window, wherein the dimensions of the window are the dimensions of the film to be cut for the window.

In another example, a server includes an interface module configured to receive an image of a window captured by a mobile device, the window having a plurality of removable cards placed on the window, wherein the plurality of removable cards collectively define a plurality of correspondence points, and wherein the plurality of correspondence points comprise at least a set of correspondence points visible in the image at pre-defined positions on the respective removable card. Furthermore, the server includes a processor configured to detect a set of locations of each of the set of correspondence points, calculate dimensions of the window based on the set of locations and the pre-defined positions of the correspondence points on the respective removable cards, wherein calculating the dimensions removes perspective distortions in the image, and output information indicative of the dimensions of the window via the interface module, wherein the dimensions of the window are dimensions of a film to be cut for the window.

In another example, a method includes receiving, by a device, an image of a window captured by an image capture module of a mobile device, the window including a plurality of removable cards placed on the window, wherein the plurality of removable cards collectively define a plurality of correspondence points, and wherein the plurality of correspondence points comprise at least a set of correspondence points visible in the image at pre-defined positions on the respective removable card, and detecting, by the device, a set of locations of each of the set of correspondence points. The method further includes calculating, by the device, dimensions of the window based on the set of locations and the pre-defined positions of the correspondence points on the respective removable cards, wherein calculating the dimensions of the window removes perspective distortions from the image, and outputting, by the device, the dimensions of the window, wherein the dimensions of the window are dimensions of a film to be cut for the window.

In another example, a window measurement kit for measuring dimensions of a window includes a plurality of removable cards collectively including a plurality of correspondence points, each removable card of the plurality of removable cards including a card having a face, a group of reference markers located on the face, wherein each reference marker of the group of reference markers comprises a square having a unique pattern, and wherein a single correspondence point of the plurality of correspondence points is represented by a respective corner of the square, an adhesive mechanism for removably attaching the removable card to the window, and one or more characters disposed on the face.

The techniques of this disclosure may provide one or more advantages. For example, the techniques may improve accuracy of calculated window dimensions. By determining sub-pixel locations of objects within an image and mapping between sets of data including the sub-pixel locations, the techniques of this disclosure may more precisely determine window dimensions, thus increasing a likelihood that a film is sized correctly. In addition, the techniques of this disclosure may enable quickly measuring many windows. For example, the techniques allow for automatically providing window dimensions based on a captured image of the window, potentially significantly decreasing time needed to measure windows. Further, the adhesive mechanism may allow a user to easily apply and remove the removable cards from the surface of the window and use the removable cards to obtain accurate measurements of many windows.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
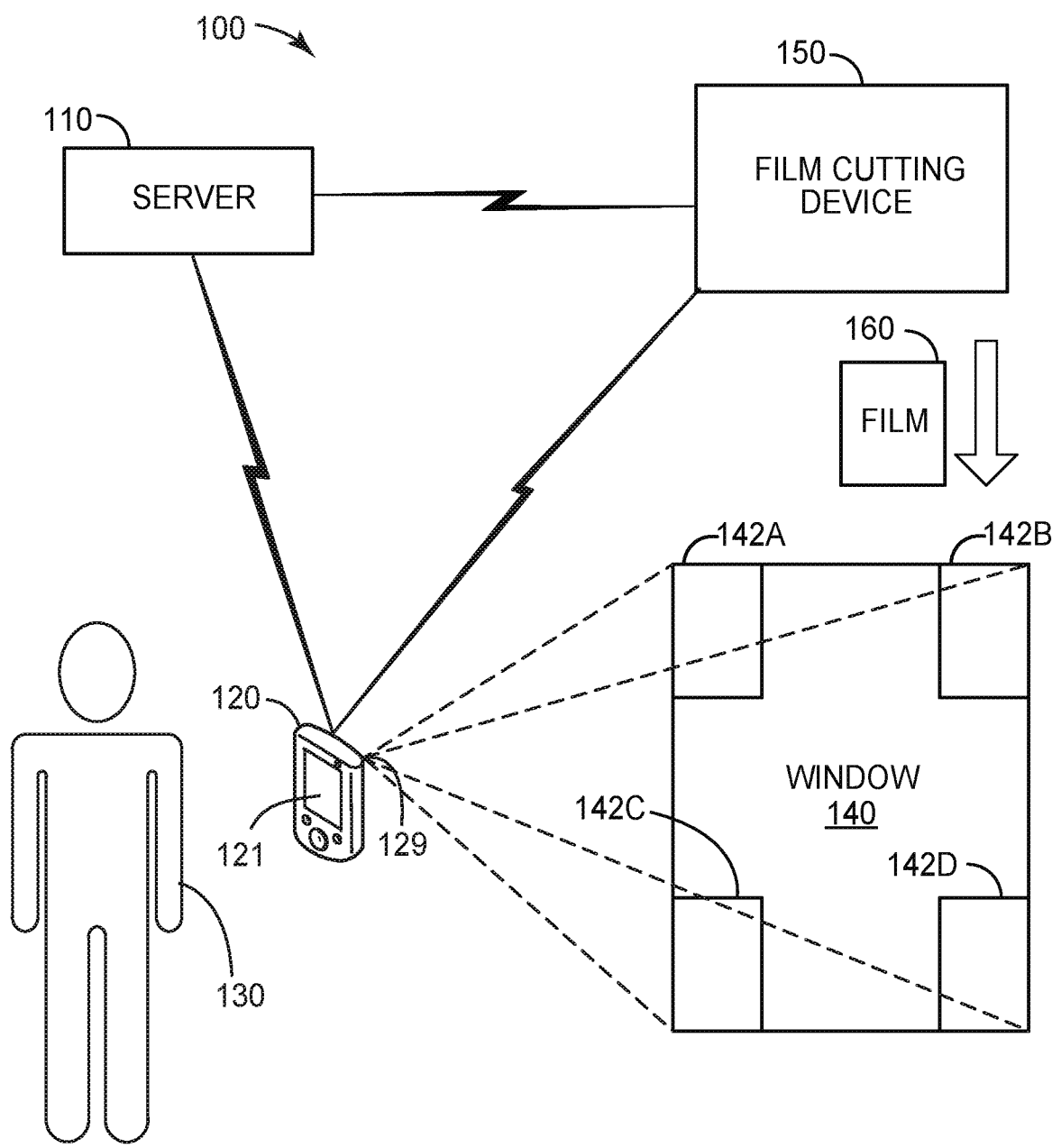
FIG. 1 is a conceptual diagram illustrating an example system for determining dimensions for window films, in accordance with aspects of this disclosure.

Systems and techniques are described for automatically determining window dimensions to enable cutting a sheet of window film to an accurate custom size for the dimensions of the window. Accuracy may be important when the film is cut, as a slight error in cutting the film may lead to visible wrinkles and folds after a user installs the film. In many cases, the actual dimensions of windows of nominally identical size differ by a small margin. Consequently, a high level of skill may be required to adequately size and apply the film to the window, and the user must carefully measure the dimensions of each window being fitted for film.

The present disclosure describes techniques for automatically measuring window dimensions and thereby determining dimensions for a window film to be applied to a window. For example, techniques are described for a computing system recognizing removable objects temporarily placed on a window, determining locations of the objects placed on the window, and relating the determined locations to a set of pre-defined locations of the objects to calculate the dimensions of the window.

In one method of this disclosure, a window measurement application executed by a mobile device may instruct a user to place a plurality of removable cards on a surface of a window. The plurality of removable cards may include a plurality of markers, and the plurality of markers may include a plurality of correspondence points. The window measurement application may instruct the user to capture an image of the window including the plurality of removable cards placed in corners of the window. Subsequently, in one example, the window measurement application uploads the image to a server, and the server calculates the width and the height of the window based on the plurality of removable cards placed on the surface of the window. In one example, the server may output information indicative of the calculated dimensions to the mobile device. Alternatively, in another example, the window measurement application calculates the dimensions of the window without uploading the image to the server.

After obtaining the dimensions of the window, the mobile device may be configured to prompt the user to cut the film according to the calculated dimensions. In one example, the mobile device is further configured to output the calculated dimensions to a computing system that operates a film cutting device, the film cutting device cutting the film having dimensions matching dimensions of the window. In this manner, the film may be precut to the correct dimensions for the window, before being sent to the location of the film customer for installation. This may make it easier for an inexperienced customer to order correctly sized custom precut window films to install themselves. The window measurement application executed by the mobile device may be configured to request and/or receive user specific information from the user (e.g., payment information and user address). Furthermore, the mobile device application may be configured to provide additional useful information to the user such as recommended practices for installation and post-installation cleaning and maintenance.

The methods and systems of this disclosure may enable quickly measuring many windows. For example, if several windows of a new home are being fitted for window film, the window measurement systems disclosed herein may facilitate timely obtaining window film having correct dimensions. The techniques of this disclosure may map between sets of data to obtain accurate measurements, and the mobile device and the server may use image processing techniques to further improve the accuracy of the measurements.

FIG. 1 is a conceptual diagram illustrating an example system 100 for determining dimensions for window films, in accordance with aspects of this disclosure. In the example illustrated in FIG. 1, system 100 includes server 110, mobile device 120 including presentation device 121 and image capture device 129, user 130, window 140, cards 142A, 142B, 142C, and 142D ("cards 142"), film cutting device 150, and film 160.

Server 110 may include one or more processors, including at least one of microprocessors, digital signal processors (DSPs), application specific integrated circuits (ASICs), field programmable gate arrays (FPGAs), or any other equivalent integrated or discrete logic circuitry, as well as any combinations of such components. Server 110 may be able to connect to a variety of devices, including mobile device 120. Additionally, server 110 may be configured to connect to tablet devices, desktop computers, and other computing devices.

In one example, mobile device 120 includes, among other components, image capture device 129 and presentation device 121. In addition, although not shown in FIG. 1, mobile device 120 may include one or more processors, microprocessors, internal memory and/or data storage and other electronic circuitry for executing software or firmware to provide the functionality described herein. In some examples, operations described for purposes of example as being performed at server 110 may instead be performed at mobile device 120.

In one example, mobile device 120 uses image capture device 129 to capture an image of window 140 having multiple objects, such as cards 142, placed on window 140. For instance, in the example illustrated in FIG. 1, a user such as user 130 has placed cards 142 in the corners of window 140. Cards 142 may be removable, such as by including a removable mechanism on one face. Cards 142 may collectively include a plurality of correspondence points (not pictured in FIG. 1). In some examples, cards 142 each include a group of reference markers. Each of the reference markers includes a square having a unique pattern, and each correspondence point of the plurality of correspondence points is a respective corner of the square. In one example, mobile device 120 instructs user 130 to place cards 142 on the surface of window 140. Subsequently, mobile device 120 directs user 130 to capture an image of window 140 with image capture device 129 of mobile device 120.

Image capture device 129 may be a camera or other component configured to capture image data representative of cards 142 placed on window 140. In other words, the image data captures a visual representation of an environment, such as window 140, having a plurality of cards 142 placed on window 140. Although discussed as a camera of mobile device 120, image capture device 129 may include other components capable of capturing image data, such as a video recorder, an infrared camera, a CCD (Charge Coupled Device) array, a laser scanner, or the like. Moreover, the captured image data can include at least one of an image, a video, a sequence of images (e.g., multiple images taken within a time period and/or with an order), a collection of images, or the like, and the term input image is used herein to refer to the various example types of image data. In some cases, an accuracy of window dimensions determined by system 100 may be improved by system 100 processing a series of images depicting window 140.

In one example, mobile device 120 uploads the image of window 140 to server 110 for processing via a wireless communication link, such as but not limited to high-frequency radio frequency (RF) signals. Server 110 is configured to receive the image of window 140 captured by mobile device 120 and calculate the dimensions of window 140. Initially, the server may detect, in the image, a set of correspondence points of the plurality of correspondence points located on cards 142. The set of correspondence points may be a subset of the plurality of correspondence points, and each correspondence point of the set of correspondence points is detectable, e.g., by server 110, in the image of window 140. The remaining correspondence points of the plurality of correspondence points 142 may be those correspondence points that server 110 cannot detect in the image of window 140 captured by mobile device 120. In some cases, a correspondence point may be undetectable in the image if mobile device 120 did not capture the entire surface area of window 140 and cards 142. In some cases, a correspondence point may be undetectable if the correspondence point is obstructed by an object in the image, or if the quality of the image is insufficient.

In one example, subsequent to receiving the image, server 110 performs an initial processing step that includes filtering the image by changing one or more parameters of the image data. For instance, server 110 may alter the brightness of the image, the contrast of the image, or another parameter of the image to identify additional correspondence points of the plurality of correspondence points. The additional correspondence points are not included in the set of correspondence points initially detectable in the image. The dimensions of window 140 calculated by server 110 may be more accurate if more correspondence points are detected in the image captured by image capture device 129 of mobile device 120. Therefore, filtering the image with server 110 may produce a more accurate approximation of the dimensions of window 140 if server 110 can then detect more correspondence points.

Server 110 is also configured to identify precise locations of each correspondence point detectable in the image. For example, server 110 may detect a set of locations in the image, each location of the set of locations representing a sub-pixel location. Sub-pixel locations of the correspondence points detected by server 110 may produce a more accurate approximation of the dimensions of window 140 and the corresponding window film. In one example, server 110 may use the Harris corner algorithm to detect the set of locations representing the sub-pixel locations of each correspondence point detected in the image.

For instance, server 110 may store a list of pre-defined locations of each correspondence point of the plurality of correspondence points located on cards 142. In one example, a memory of server 110 stores the list of pre-defined locations. In contrast to the set of locations, which are detected by the server, the pre-defined locations are known, real-world locations of the correspondence points on a card, e.g., relative to the boundaries of the card itself. In one example, the pre-defined locations are only known relative to a singular removable card of cards 142. For instance, a pre-defined location of a correspondence point located on removable card 142A includes the coordinates of the correspondence point on removable card 142A, but does not give the coordinates of the correspondence point relative to cards 142B, 142C, and 142D.

Once server 110 detects the set of sub-pixel locations, server 110 may calculate one or more dimensions of window 140 (and accordingly, of the film to be applied to the window) based on the set of locations and the pre-defined positions of the correspondence points on cards 142. In one example, server 110 may place the set of sub-pixel locations and the pre-defined positions of correspondence points in a matrix, relating the set of sub-pixel locations and the pre-defined positions with the one or more dimensions of window 140. Server 110 is configured to calculate the dimensions by mapping between the set of locations and the pre-defined positions of the correspondence points. As server 110 calculates the dimensions, server 110 may also removes any existing perspective distortion in the image. For example, user 130 may capture an image of window 140 including a perspective distortion in the image, e.g., the image has a rectilinear distortion from the perspective at which the image was taken. Consequently, in this example, window 140 will not appear as a perfect rectangle in the image captured by mobile device 120. However, as server 110 processes the image to determine the dimensions of the film to be cut for window 140, server 110 corrects for the perspective distortion. In some examples, server 110 produces a corrected image in which window 140 is represented as a perfect rectangle.

In some examples, mobile device 120 may process the image of window 140 before uploading the image to server 110. In one example, mobile device 120 detects a set of correspondence points in the image. The set of correspondence points may be a subset of the plurality of correspondence points located on cards 142. If mobile device 120 is not able to detect at least a pre-defined threshold number of correspondence points in the image, mobile device 120 may output an indication that the number of detected correspondence points is insufficient, and outputs an instruction to user 130 to capture a new image of window 140. In another example, server 110 may instead detect the subset of the plurality of correspondence points located on cards 142, and server 110 outputs an indication to mobile device 120 if the set of correspondence points is insufficient, and mobile device 120 in turn then outputs an instruction to capture a new image of window 140.

In one example, after calculating the dimensions of window 140, server 110 outputs the dimensions to a computing system that operates film cutting device 150. Film cutting device 150 cuts film 160 having dimensions matching the dimensions of window 140. For example, the dimensions of window 140 may include a height of window 140 and a width of window 140. Subsequently, the precut film is transported to the site of window 140 and installed by user 130. In another example, server 110 outputs the dimensions of window 140 to mobile device 120, and mobile device 120 instructs user 130 to cut film 160 having dimensions matching the dimensions of window 140. In one example, after cutting film 160, a customer (which may be user 130) receives and installs the film.

In another example, mobile device 120 may detect the set of locations in the image representing sub-pixel locations and calculate the dimensions of window 140 without transmitting the image to server 110. Subsequently, mobile device 120 may output the dimensions (e.g., height and width) to the computing system that operates film cutting device 150, and film cutting device 150 may cut film 160 having dimensions matching the height and the width of window 140. In another example, mobile device 120 outputs the height and the width to presentation device 121, and user 130 cuts film 160 having dimensions matching the height and the width of window 140. After film cutting device 150 cuts film 160 having dimensions matching the height and the width of window 140, the computing system that operates film cutting device 150 may output instructions to transport film 160 to a location of the window. In this manner, a customer can receive film 160, precut to the particular dimensions of the window.

In one example, window 140 includes a transparent window made of glass, Plexiglass, or other transparent material. In another example, window 140 is translucent. Window 140 may include an exterior window, e.g., window 140 is part of an external wall of a building. In another example, window 140 includes an interior window, e.g., window 140 is part of an internal wall of a building. In another example, window 140 a portion of a door or forms a door itself. In another example, window 140 defines a portion of a wall, or an entire wall. Additionally, window 140 may define a variety of other features, such as but not limited to skylights, walls, countertop surfaces, tiles, and cabinets. In one example, window 140 defines a rectangle. In other examples, window 140 defines other shapes such as but not limited to equilaterals, triangles, and polygons.

In some examples, a device of this disclosure (e.g., server 110 and mobile device 120) configured to calculate the dimensions of window 140 may output information indicative of the dimensions. In one example, the information indicative of the dimensions includes length values (e.g., height and width). In another example, the information indicative of the dimensions includes a plurality of points defining a shape of window 140 (e.g., four or more points). In some examples, the information indicative of the dimensions may include a plurality of coordinates (e.g., x, y coordinates) of points defining a shape of the window, such as corners.

In some examples, a memory of server 110 and a data storage of mobile device 120 may be configured to store user information (e.g., user payment information and/or user address). User information may be used to facilitate payment for film-cutting services, and for shipping materials (e.g., the film sized by film cutting device 150, removable cards 142, and user instructions) to the location of user 130. Mobile device 120 may output a request for updated information if the user information stored by server 110 and mobile device 120 is inadequate.

Figure 2:
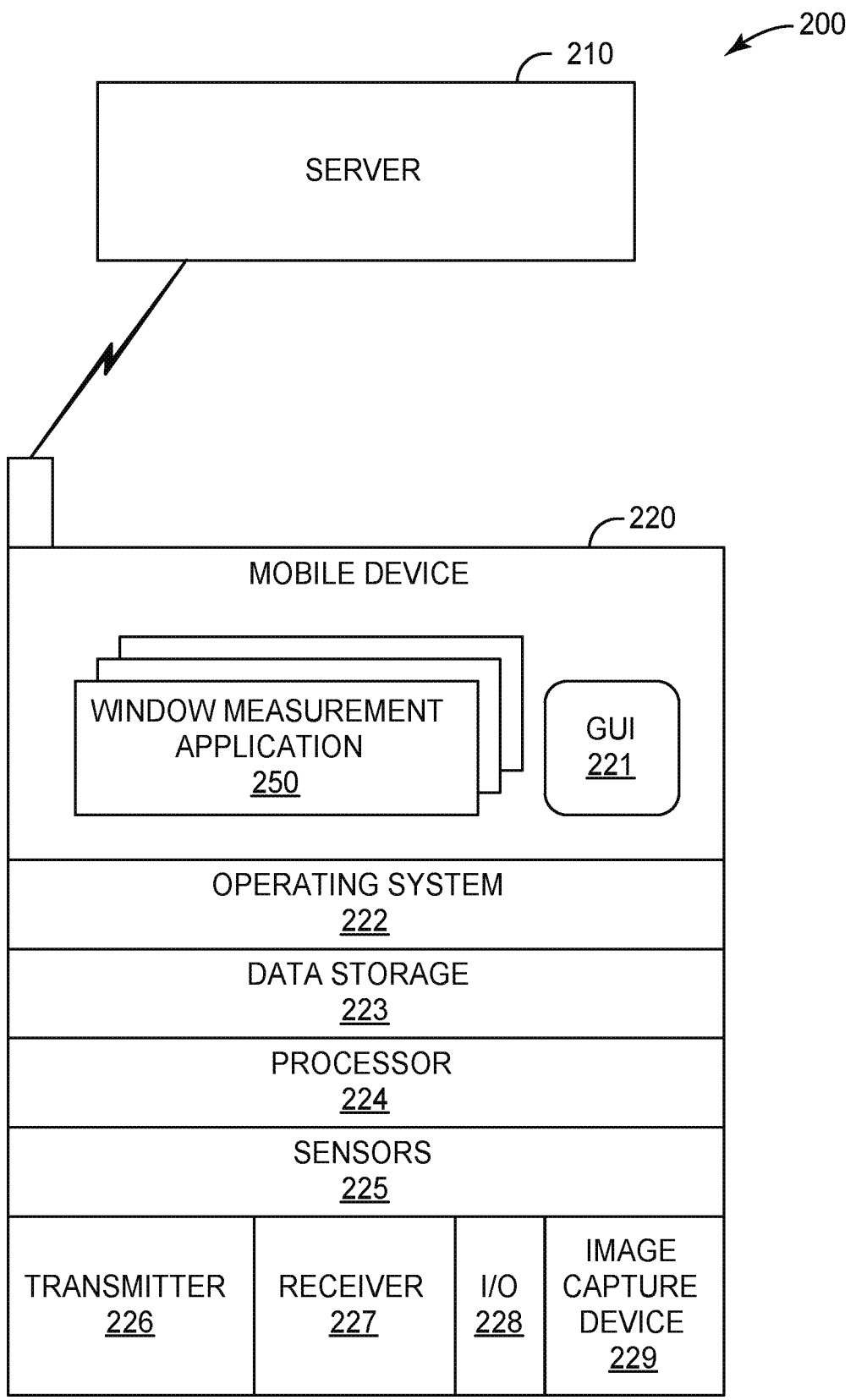
FIG. 2 is a block diagram illustrating an example system illustrating a mobile device of FIG. 1 in more detail, in accordance with aspects of this disclosure.

FIG. 2 is a block diagram illustrating an example system 200 illustrating a mobile device of FIG. 1 in more detail, in accordance with aspects of this disclosure. Mobile device 220 may be an example of mobile device 120 of FIG. 1. Additionally, server 210, as illustrated in FIG. 2, may be an example of server 110 of FIG. 1.

In this example, mobile device 220 includes various hardware components that provide core functionality for operation of the device. For example, mobile device 220 includes one or more programmable processors 224 configured to operate according to executable instructions (e.g., program code), typically stored in a computer-readable medium or data storage 223 such as static, random-access memory (SRAM) device or Flash memory device. Input/output (I/O) 228 may include one or more devices, such as a keyboard, camera button, power button, volume button, home button, back button, or menu button. Transmitter 226 and receiver 227 provide wireless communication with other devices, such as server 210, via a wireless communication link, such as but not limited to high-frequency RF signals. Mobile device 220 may include additional discrete digital logic or analog circuitry not shown in FIG. 2.

In general, operating system 222 executes on processor 224 and provides an operating environment for one or more user applications (commonly referred to "apps"), including window measurement application 250. User applications may, for example, include executable program code stored in computer-readable storage device (e.g., data storage 223) for execution by processor 224. As other examples, user applications may include firmware or, in some examples, may be implemented in discrete logic.

In operation, mobile device 220 receives input image data and processes the input image data in accordance with the techniques described herein. For example, image capture device 229 may capture an input image of a window having a plurality of removable cards placed on the window, such as window 140 of FIG. 1 having cards 142. As another example, mobile device 220 may receive image data from external sources, such as server 210. In general, mobile device 220 stores the image data in data storage 223 for access and processing by window measurement application 250 and/or other user applications.

As shown in FIG. 2, user applications may invoke kernel functions of operating system 222 to output a graphical user interface (GUI) 221 for presenting information to a user of mobile device. As further described below, window measurement application 250 may construct and control GUI 221 to prompt a user, such as user 130 of FIG. 1 to capture an image. For example, window measurement application 250 may instruct GUI 221 to inform a user that the number of correspondence points detected in an image is insufficient and instruct the user to capture a new image. Further, GUI 221 may be configured to display the dimensions of window 140 calculated by server 110, mobile device 220 receiving the dimensions via receiver 227.

Mobile device 220 can optionally include one or more sensors 225 to detect and collect environmental data. For example, the sensors 225 can include an optical sensor to detect and collect data regarding lighting condition. Such data can be provided to window measurement application 250 to adjust the setting of the image capture device 229 (e.g., turn on the flash, etc.) and/or generate an operation hint (e.g., "use flash for better result", etc.). Some external sources, for example, external flash devices or the like, can also be used to change the lighting condition. The sensors 225 can also include an accelerometer to determine how much shake or user induced motion exists while capturing and a hint such as "hold steady" or "use tap and hold capture" can be indicated to mitigate this effect. In addition, an optimized engine works on the live video stream to detect the physical window. If the size of the detected window is smaller than a pre-determined threshold, the user may be urged to move closer to the physical window.

Window measurement application 250 may be executed by processor 224 of mobile device 220. In one example, window measurement application 250 detects correspondence points in the image captured by image capture device 229 of mobile device 220. Window measurement application 250 may output an indication to GUI 221, informing a user, such as user 130 of FIG. 1, that not enough correspondence points were detected in the image. Furthermore, window measurement application 250 may output an instruction directing user 130 to capture a new image using mobile device 220.

Furthermore, in some examples, window measurement application 250 is configured to perform image processing functions, including but not limited to changing the brightness and contrast of an image, converting a color image to grayscale, and applying low-pass and high-pass filters to the image. Window measurement application 250 may be configured to transmit an image of window 140 having cards 142 placed on the surface of the window to server 210 via transmitter 226 and receive from server 110 dimensions of window 140 based on the image.

In one example, window measurement application 250 is configured to process an image of a window captured by image capture device 229, such as window 140 of FIG. 1. In the image, cards 142 are placed on window 140. Cards 142 collectively define a plurality of correspondence points, and the plurality of correspondence points include at least a set of correspondence points visible in the image at pre-defined positions on the respective removable card. Window measurement application 250 receives image data associated with the image captured by image capture device 229 and processes the image data to account for perspective distortions in the image and determine the dimensions of a film, e.g., film 160 to be cut for window 140 based on the set of correspondence points and the pre-defined positions.

For example, window measurement application 250 is configured to detect a set of locations of each of the set of correspondence points visible in the image. Each location of each correspondence point detected by window measurement application 250 may be a sub-pixel location. In one example, window measurement application 250 uses the Harris corner algorithm to detect sub-pixel locations of the correspondence points. For example, window measurement application 250 may use the Harris corner algorithm to determine the difference between straight lines e.g., "edges," and junctions between two or more straight lines, e.g., "corners" by taking a spatial derivative of the image to identify gradients representing edges in the image. If more than one edge is detected at a point in the image, window measurement application 250 may identify the point as a corner. Specifically, the Harris corner algorithm may be able to determine a location of a corner, the location being a sub-pixel location. The location is a sub-pixel location in that the location may possess a finer resolution than pixels of the image itself. In some examples, the location of a corner detected by window measurement application 250 may be on a boundary between two pixels of the image captured by mobile device 320.

Furthermore, window measurement application 250 is configured to calculate one or more dimensions of window 140 based on the set of locations and the pre-defined positions of the correspondence points. In one example, the pre-defined positions are stored in data storage 223. The pre-defined positions may be a list of known coordinates of each correspondence point located on cards 142. In some examples, mobile device 220 receives the pre-defined positions from server 110.

In an example in which removable card 142 of the plurality of removable cards includes a group of reference markers, and each reference marker of the group of reference markers includes a square having a unique pattern, window measurement application 250 is configured to arrange the correspondence points of the plurality of removable cards, i.e., the corners of the group of reference markers in a matrix. For example, window measurement application 250 is configured to identify the unique pattern of the reference markers in a matrix based on the unique pattern of each reference marker. Window measurement application 250 is configured to map from a vector space including the set of correspondence to another vector space including the pre-defined positions stored in data storage 223, e.g., based on the matrix. Window measurement application 250 may execute a Euclidean norm and calculate a first parameter and a second parameter of window 140. Subsequently, window measurement application 250 may calculate a width of window 140 by adding a first constant to the first parameter and calculate a height of window 140 by adding a second constant to the second parameter to account for the dimensions of cards 142.

The first constant and the second constant may represent the dimensions of a single removable card, such as removable card 142A, 142B, 142C, or 142D. In one example, the first constant is 5.5 inches, and the second constant is 8.5 inches. However, in other examples, the first constant and the second constant are other values.

Subsequent to calculating the dimensions of window 140, mobile device 220 may output the dimensions to GUI 221 for display. In some examples, a user such as user 130 may cut a film having dimensions matching the dimensions of window 140 measured by mobile device 220. In another example, mobile device may output the dimensions to a film cutting device, such as film cutting device 150 of FIG. 1, and film cutting device 150 may cut the film according to the dimensions of window 140.

Figure 3:
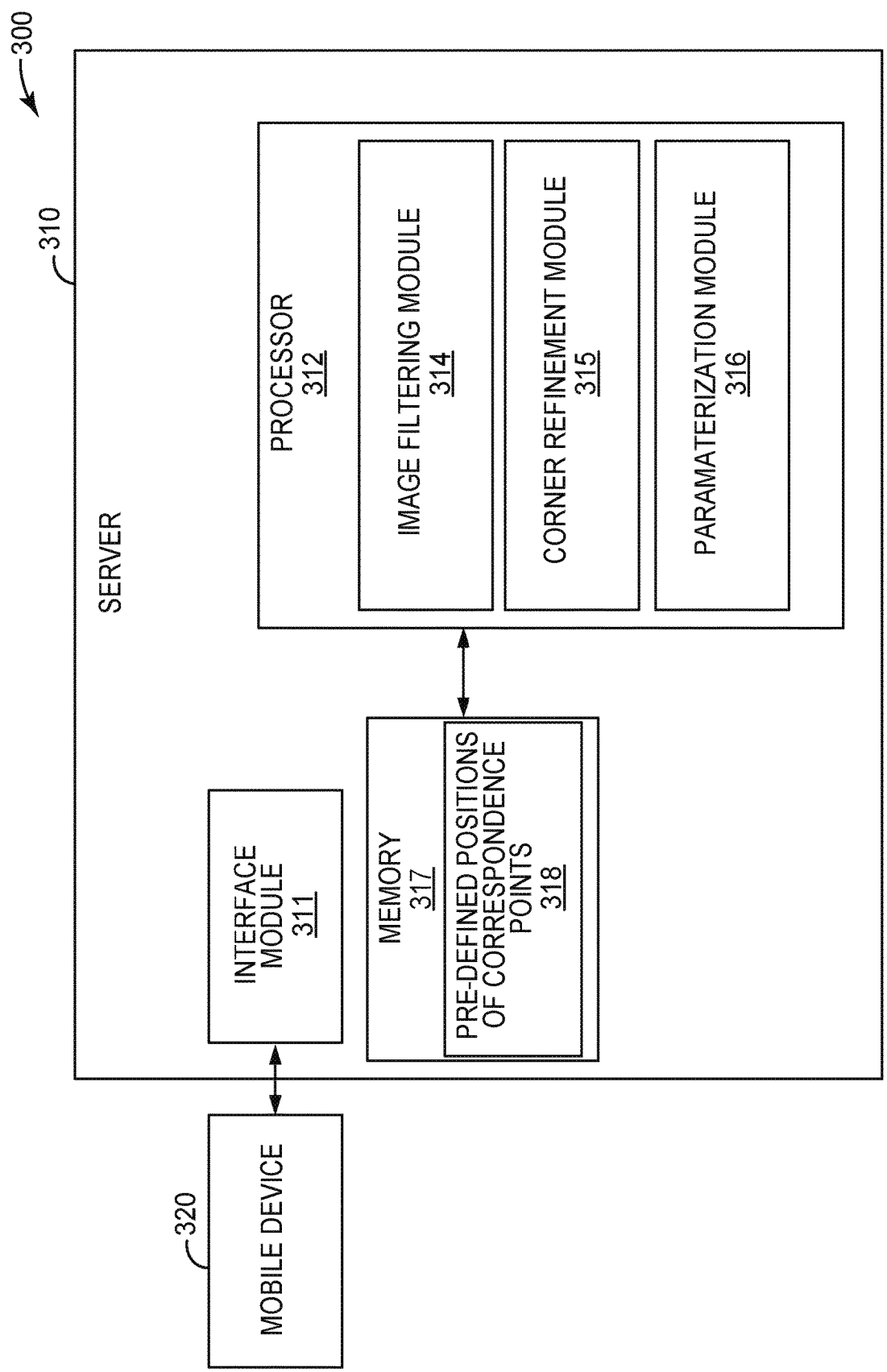
FIG. 3 is a block diagram illustrating an example system including a server of FIG. 1 in more detail, in accordance with aspects of this disclosure.

FIG. 3 is a block diagram illustrating an example system 300 including a server of FIG. 1 in more detail, in accordance with aspects of this disclosure. As illustrated in FIG. 3, system 300 includes server 310 having interface module 311, processor 312, image filtering module 314, corner refinement module 315, parameterization module 316, memory 317, pre-defined positions of correspondence points 318, and mobile device 320. Server 310 may be an example of server 110 of FIG. 1. Mobile device 320 may be an example of mobile device 120 of FIG. 1.

Interface module 311 may be configured to receive, from mobile device 320, image data indicative of an image of a window, such as window 140 of FIG. 1, captured by mobile device 320. The received image of window 140 may include cards 142 placed on window 140, and the plurality of removable cards collectively define a plurality of correspondence points. However, in one example, a set of correspondence points of the plurality of correspondence points is detectable in the image. Pre-defined positions 318 may be associated with each correspondence point of the plurality of correspondence points on the respective removable card, and the pre-defined positions may be stored in memory 317. Interface module 311 may receive the image from mobile device 320 via a wireless communication link, as such as but not limited to a high-frequency RF signal.

Interface module 311 provides an interface configured to receive data from window measurement application 250, including image data. Interface module 311 may store the image data to a database repository, e.g., memory 317, and processor 312 processes the images as described herein. Interface module 311 may also be configured to receive data including instructions. In one example, interface module 311 provides an external application programming interface (API) endpoint with which external devices, such as mobile devices, may send data to server 310 using APIs and requesting control processing operations to be performed by server 310. For example, interface module 311 may receive data, such as image data, from window measurement application 250 and also receive instructions or requests from window measurement application 250 to process the data.

Processor 312 may include one or more processors, including at least one of microprocessors, DSPs, ASICs, FPGAs, or any other equivalent integrated or discrete logic circuitry, as well as any combinations of such components. In the example illustrated in FIG. 3, processor 312 is configured to execute image filtering module 314, corner refinement module 315 and parameterization module 316.

In some cases, image filtering module 314 may perform image processing to detect correspondence points otherwise undetectable in the image received from mobile device 320. Image filtering module 314 may filter the image. For example, image filtering module 314 may change a parameter of the image to identify additional correspondence points. The additional correspondence points are a subset of the plurality of correspondence points, however, in some cases, the additional correspondence points are not included in the set of correspondence points initially detectable in the image captured by mobile device 320. Parameters changed by image filtering module 314 may include contrast, brightness, or a combination thereof. In other examples, image filtering module 314 may alter other parameters of the image. Increasing the number of correspondence points detectable in the image may improve the accuracy of the dimensions calculated by server 310.

Corner refinement module 315 may detect a set of locations of each of the set of correspondence points initially visible in the image received by telemetry module 311. Additionally, corner refinement module 315 may detect locations of each additional correspondence point identified by image filtering module 314. Each location of each correspondence point detected by corner refinement module 315 may be a sub-pixel location.

In one example, corner refinement module 315 may use the Harris corner algorithm to detect sub-pixel locations of the correspondence points. For example, corner refinement module 315 may use the Harris corner algorithm to determine the difference between edges and corners and determine a location of a corner within an image as discussed with respect to window measurement application 250 of FIG. 2.

In one example, parameterization module 316 may calculate a first parameter and a second parameter of window 140 based on the locations detected by corner refinement module 315 and the pre-defined positions 318 of the correspondence points stored in memory 317. Pre-defined positions 318 may be a list of known coordinates of each correspondence point located on each removable card. In one example, parameterization module 316 is configured to calculate the first parameter and the second parameter by mapping between the set of locations and the pre-defined positions of the correspondence points. In another example, parameterization module 316 is configured to calculate less than or more than two parameters. For example, parameterization module 316 may calculate six separate parameters representing the dimensions of any quadrilateral window. Additionally, or alternatively, parameterization module 316 may calculate a plurality of parameters representing the dimensions of any polygonal window (e.g., regular polygons, irregular polygons, convex polygons, non-convex polygons, rectilinear polygons, cyclic polygons, or the like). In some examples, the angles between edges of a window may not include right angles. In one example, parameterization module 316 may calculate parameters representing the dimensions of a polygonal window, each edge of the window being a different length, and each angle between edges of the window having a different angular value. For example, the height on one edge of the window may be greater than the height of the opposite edge.

Since each removable card of the plurality of removable cards includes a group of reference markers, and each reference marker of the group of reference markers includes a square having a unique pattern, server 310 is configured to arrange the correspondence points of the plurality of removable cards, e.g., the corners of the group of reference markers in a matrix. In one example, server 310 is configured to identify the unique pattern of the reference markers in a matrix based on the unique pattern of each reference marker. For example, as shown below in matrix A and vector b, parameterization module 316 may calculate the first parameter and the second parameter by first relating the pre-defined positions 318, e.g., ($x_i$, $y_i$) and the set of locations determined by corner refinement module 315, e.g., ($x'_i$, $y'_i$).

$$A(\alpha, \beta) = \begin{bmatrix} x_1 & y_1 & 1 & 0 & 0 & 0 & x_1 x'_1 & y_1 x'_1 \\ 0 & 0 & 0 & x_1 & y_1 & 1 & x_1 y'_1 & y_1 y'_1 \\ x_2 & y_2 & 1 & 0 & 0 & 0 & x_2 x'_2 & y_2 x'_2 \\ 0 & 0 & 0 & x_2 & y_2 & 1 & x_2 y'_2 & y_2 y'_2 \\ \cdots & \cdots & \cdots & \cdots & \cdots & \cdots & \cdots & \cdots \\ x_{64} & y_{64} & 1 & 0 & 0 & 0 & x_{64} x'_{64} & y_{64} x'_{64} \\ 0 & 0 & 0 & x_{64} & y_{64} & 1 & x_{64} y'_{64} & y_{64} y'_{64} \end{bmatrix}; b = \begin{bmatrix} x'_1 \\ y'_1 \\ x'_2 \\ y'_2 \\ \vdots \\ x'_{64} \\ y'_{64} \end{bmatrix}$$

In one example, parameterization module 316 calculates a Euclidean norm, using matrix A and vector b as inputs. A norm is a function that assigns a length to a vector in a vector space, the value assigned to the vector being a strictly positive value. In one example, parameterization module 316 may apply a Euclidean norm to ascertain the distance between a location of a correspondence point detected by corner refinement module 315 and the respective pre-defined position, the pre-defined position being mapped into the vector space of the correspondence point. Since matrix A and vector b may include coordinates of each correspondence point detected by corner refinement module 315, the Euclidean norm as represented in eq. 1 may determine $\alpha$ and $\beta$ to minimize the collective deviation between the set of locations determined in the image and the list of pre-defined locations stored in memory 317. In one example, $\alpha$ is correlated with a width of window 140, and $\beta$ is correlated with a height of window 140. The Euclidean norm used in one example of this disclosure is reproduced below.

$$E = \|b - A(\alpha,\beta) h\|_2 = \|b - A(A^T A)^{-1} A^T b\|_2 \qquad \text{(eq. 1)}$$

The transform vector, given by h, maps between a vector space containing the set of correspondence points determined by corner refinement module 315 and a vector space containing the set of pre-defined positions 318 stored in memory 317. The parameterization module 316 calculates $\alpha$ and β by iteratively minimizing the Euclidean norm using a nonlinear numerical optimization method such as the Broyden-Fletcher-Goldfarb-Shanno (BFGS) algorithm. In one example, iteratively minimizing the Euclidean norm, among other operations performed by parameterization module 316, removes perspective distortions in the image.

In calculating the dimensions of window 140, parameterization module 316 may remove or otherwise account for perspective distortions in the image. For example, parameterization module 316 may process the image to produce a corrected image that represents window 140 in a corrected object plane, the corrected object plane having no perspective distortions with respect to window 140. For example, image capture device 229 may capture an image of window 140 having a perspective distortion in the image, e.g., the image has a rectilinear distortion from the perspective at which the image was taken. Consequently, in this example, window 140 will not look like a perfect rectangle in the image captured by mobile device 120. However, as parameterization module 316 calculates the window dimensions, parameterization module 316 corrects for the perspective distortion.

In one example, parameterization module 316 calculates the width and the height of window 140 by adding a first constant to α and a second constant to β. In one example, the first constant is 5.5 inches and the second constant is 8.5 inches, as in following equations.

$$\text{window width} = \alpha + 5.5" \quad (\text{eq. 2})$$

$$\text{window height} = \beta + 8.5" \quad (\text{eq. 3})$$

In another example, server 310 outputs α and β to mobile device 320, and mobile device 320 calculates window width and window height according to equation 2 and equation 3. Mobile device 320 may be configured provide instructions to cut the film having dimensions output by GUI 221, such as dimensions matching the window width and the window height.

Figure 4:
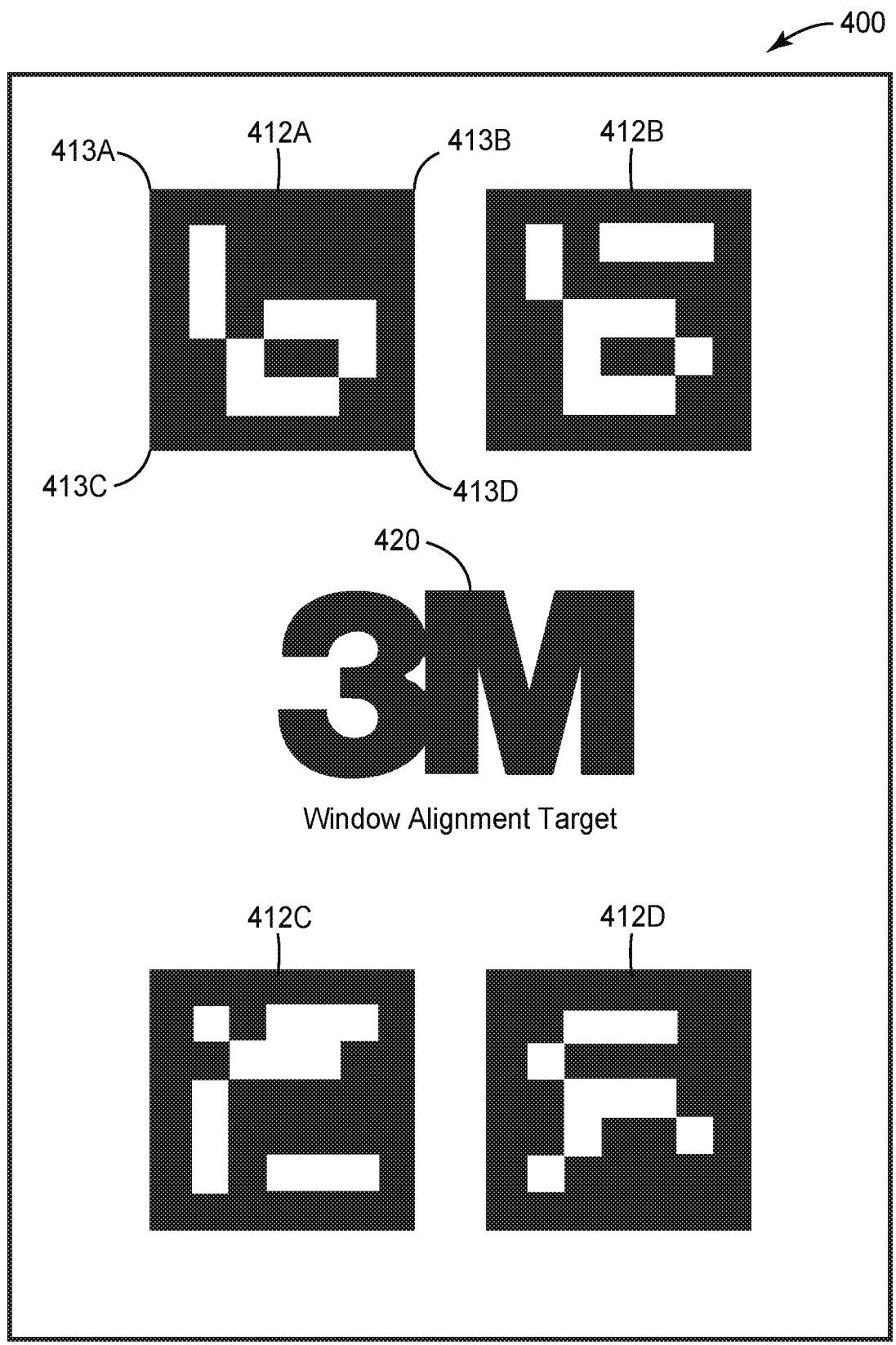
FIG. 4 is a block diagram of an example removable card in accordance with aspects of this disclosure.

FIG. 4 is a block diagram of an example removable card 400 in accordance with aspects of this disclosure. Removable card 400 may be an example of removable card 142A, 142B, 142C, or 142D of FIG. 1. Removable card 400 includes reference markers 412A, 412B, 412C, and 412D ("reference markers 412"). In the example of FIG. 4, each reference marker 412 is a square having a unique pattern, and each correspondence point of a plurality of correspondence points is represented by a respective marker of reference markers 412. For example, reference marker 412A includes correspondence points 413A, 413B, 413C, and 413D ("correspondence points 413"). Each correspondence point of correspondence points 413 is located at a corner of reference marker 412A. Similarly, correspondence points are located at the corners of each of reference markers 412. Furthermore, one or more characters 420 may be disposed on a front face of removable card 400. In the example of FIG. 4, one or more characters 420 include the logo of The 3M Company and the phrase "Window Alignment Target."

In one example, removable card 400 includes cardboard, and reference markers 412 may be printed on a face of removable card 400. In another example, removable card 400 includes a sheet of paper. The sheet of paper is not as rigid as the cardboard of the previous example. For example, a sheet of paper may represent removable card 400, with reference markers 412 printed on a face of the sheet of paper. In other examples, removable card 400 includes other materials, such as but not limited to plastics, metals, and various types of wood. In one example, a thickness of removable card 400 is 0.05 millimeters. In other examples, the thickness of removable card 400 is greater than or less than 0.05 millimeters. In one example, removable card 400 defines a rectangle. In other examples, removable card 400 defines other shapes such as but not limited to equilaterals, circles, ovals, triangles, and polygons.

In one example, reference markers 412 may be ArUco markers. ArUco markers are a set of unique patterns that may enable the detection of the markers using a software program. For example, a software program executed by a processor may be able to detect a unique identity of an ArUco marker disposed in the center of reference marker 412A, and the software program may be configured to identify pre-defined positions of the corners of the reference marker 412A, the corners represented by correspondence points 413. ArUco markers include an n×n grid of squares, and each square of the grid of squares may be colored either white or black. In the example of FIG. 4, the ArUco markers include a 5×5 grid. The software program may be configured to detect interfaces between white squares and black squares and produce a representative binary grid. In the binary grid, '1s' represent white squares and '0s' represent black squares. After the software program creates the binary grid, the software program is configured to identify the location of correspondence points on removable card 400.

Removable card 400 may include an adhesive mechanism for removably attaching removable card 400 to a window, such as window 140 of FIG. 1. In one example, the adhesive mechanism includes an adhesive material located on a back face of removable card 400. The adhesive material may enable a user, such as user 130 of FIG. 1, to attach removable card 400 to a window. Furthermore, the adhesive material enables user 130 to detach removable card 400 from the surface of window 140, and subsequently re-attach removable card 400 to another window. The adhesive material allows user 130 to apply removable card 400 to a plurality of windows in succession, enabling user 130 to obtain measurements of each window of the plurality of windows. Furthermore, the adhesive material permits user 130 to re-position removable card 400 on a window if removable card 400 is not sufficiently aligned in a corner of window 140. In another example, removable card 400 may be formed of an electrostatic film configured to cling to a glass surface of a window. Additionally, in a further example, the adhesive mechanism includes adhesive tape applied to removable card 400.

In one example, a plurality of removable cards, including removable card 400, includes four removable cards. The four removable cards collectively include sixteen reference markers, and the sixteen reference markers collectively include sixty-four correspondence points. Cards having other, different numbers of reference markers may be used.

In one example, card 400 is rectangular and has a width of card 400 is approximately 5.5 inches, and a height of card 400 is approximately 8.5 inches. In this instance, the term 'approximately' is defined to mean a value within 0.25 inches of the reported value. Cards having other dimensions may be used.

Figure 5:
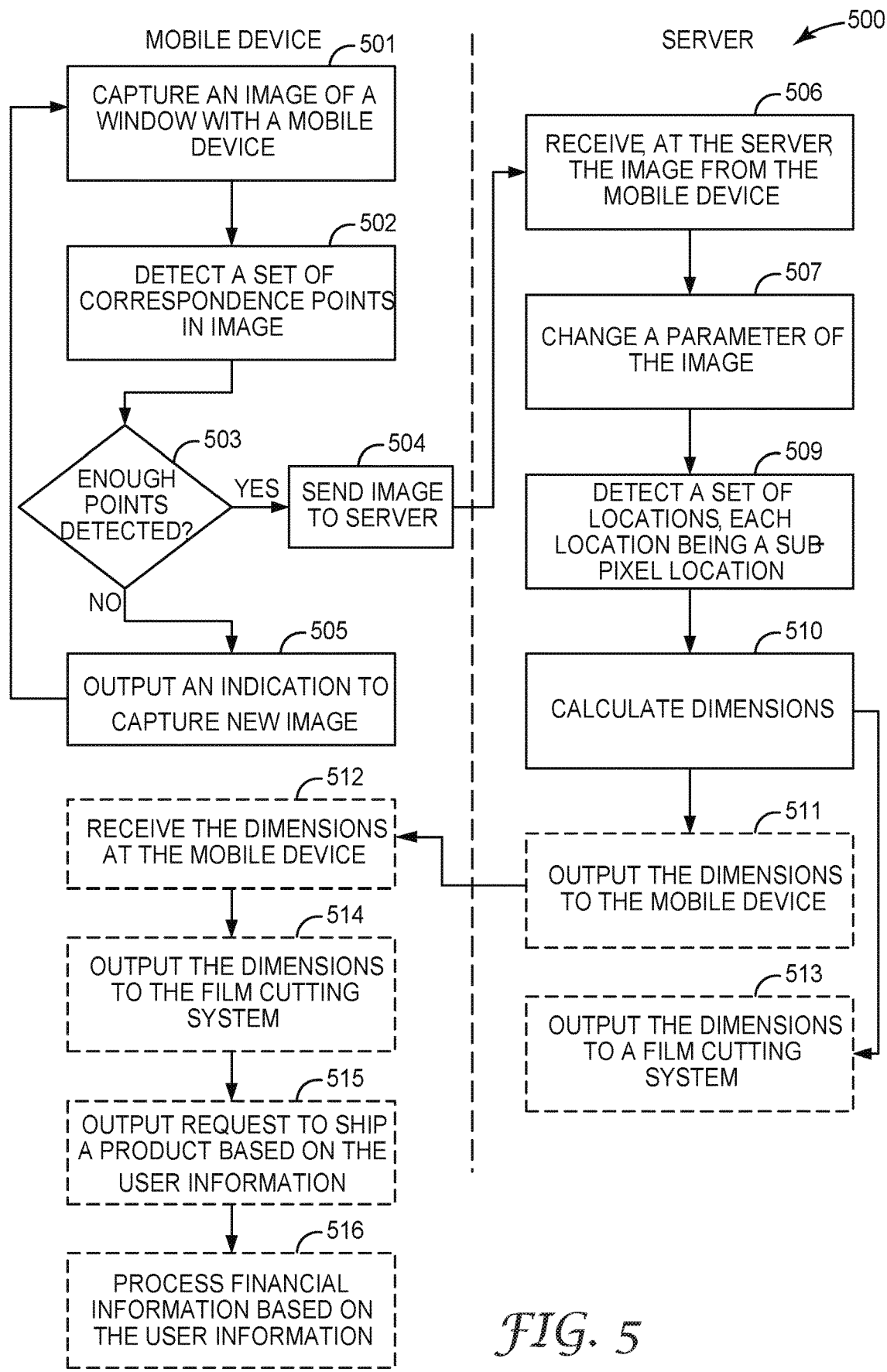
FIG. 5 is a flow diagram illustrating example operation of the system of FIG. 1, in accordance with aspects of this disclosure.

FIG. 5 is a flow diagram 500 illustrating an example operation of the system of FIG. 1, in accordance with aspects of this disclosure. For purposes of illustration only, FIG. 5 is described below within the context of system 100 of FIG. 1. However, the techniques described below can be used in any permutation, and in any combination, with server 110, mobile device 120, window 140, and cards 142. In accordance with one or more techniques of this disclosure, mobile device 120 captures an image of window 140 (501). Subsequently, mobile device 120 detects a set of correspondence points in the image (502). If mobile device 120 determines that enough correspondence points were detected (a "YES" output is generated at block 503), the process of flow diagram 500 moves to block 504. At block 504, mobile device 120 sends the image to server 110. After server 110 receives the image from mobile device 120 (506), server 110 changes a parameter of the image (507). For example, server 110 may change at least one of a contrast and a brightness of the image. Next, server 110 detects a set of locations in the corrected image, each location being a sub-pixel location (509). Server 110 calculates dimensions of window 140 (510). For example, the dimensions may correspond to a height and a width a film to be cut for window 140. In some examples, server 110 corrects or accounts for any perspective distortion when calculating the dimensions of the window. In one example, server 110 may output the dimensions to mobile device 120 (511), and mobile device 120 may receive the dimensions (512). Subsequently, mobile device 120 may output the dimensions and user information to a film cutting system (514).

In some examples, mobile device 120 requests the user to input the physical location to which the precut film should be sent, and to input information needed to conduct a financial transaction to pay for the precut film. Mobile device 120 may output a request to ship a product (515) and may process financial information according to the user information (516). In another example, server 110 may output the dimensions and user information to the film cutting system (513) without outputting the dimensions to mobile device 120. In some examples, server 110 may output instructions for sending the cut film having the determined dimensions to a customer location, and/or process the financial information, rather than mobile device 120. User information may include, but is not limited to, payment information and user address. In some examples, server 110 may be configured to store information about the transaction to send the user a reminder about additional information or film replacement information after a certain period of time has passed.

In some examples, mobile device 120 determines that not enough correspondence points were detected in the image ("NO" of block 503). When the "NO" output is generated at block 503, mobile device 120 outputs an indication to capture a new image (505), and mobile device 120 captures an image of window 140 (501).

Figure 6:
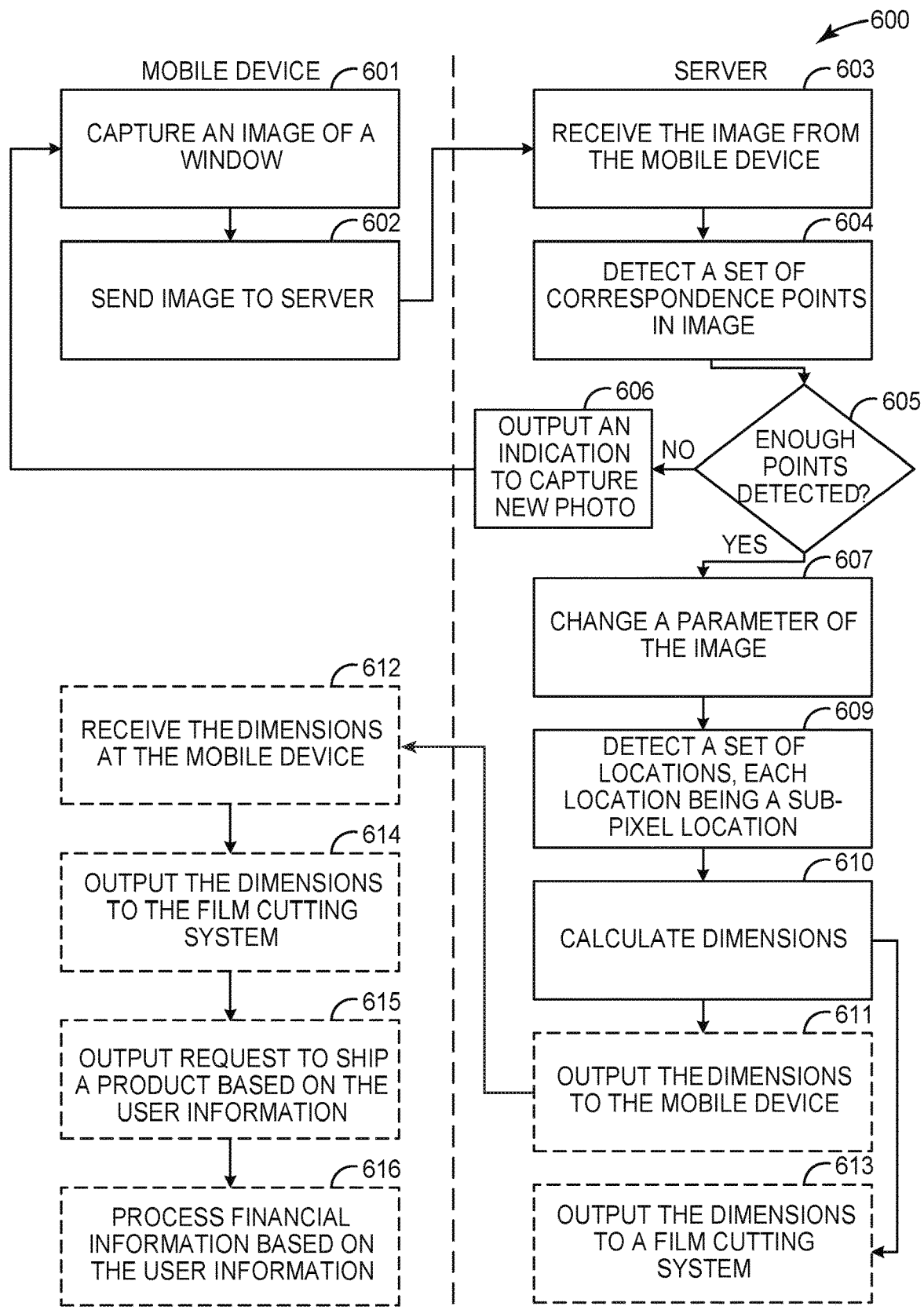
FIG. 6 is a flow diagram illustrating example operation of the system of FIG. 1, in accordance with aspects of this disclosure.

FIG. 6 is a flow diagram 600 illustrating an example operation of the system of FIG. 1, in accordance with aspects of this disclosure. For purposes of illustration only, FIG. 6 is described below within the context of system 100 of FIG. 1. However, the techniques described below can be used in any permutation, and in any combination, with server 110, mobile device 120, window 140, and cards 142. In the example of FIG. 6, accordance with one or more techniques of this disclosure, mobile device 120 captures an image of window 140 (601). Subsequently, mobile device 120 sends the image to server 110 (602). Server 110 receives the image from mobile device 120 (603). Server 110 detects a set of correspondence points in the image (604). If server 110 determines that enough correspondence points were detected ("YES" block 605), the process of flow diagram 600 moves to block 607. At block 607, server 110 changes a parameter of the image (607). For example, server 110 may change at least one of a contrast and a brightness of the image. Next, server 110 detects a set of locations in the corrected image, each location being a sub-pixel location (609). Server 110 calculates dimensions of window 140 (610). For example, the dimensions may correspond to a height and a width a film to be cut for window 140. In some examples, server 110 corrects or accounts for any perspective distortion when calculating the dimensions of the window. In one example, server 110 may output the dimensions to mobile device 120 (611), and mobile device 120 may receive the dimensions (612). Subsequently, mobile device 120 may output the dimensions and user information to a film cutting system (614).

In some examples, mobile device 120 requests the user to input the physical location to which the precut film should be sent, and to input information needed to conduct a financial transaction to pay for the precut film. Mobile device 120 may output a request to ship a product (615) and may output a request to process financial information based on the user information (616). In another example, server 110 may output the dimensions and user information to the film cutting system (613) without outputting the dimensions to mobile device 120. In some examples, server 110 may output instructions for sending the cut film having the determined dimensions to a customer location, and/or process the financial information, rather than mobile device 120. User information may include, but is not limited to, payment information and user address. In some examples, server 110 may be configured to store information about the transaction to send the user a reminder about additional information or film replacement information after a certain period of time has passed.

In some examples, when server 110 determines that not enough correspondence points were detected in the image captured by mobile device 120 ("NO" of block 605), server 110 outputs an indication to capture a new photo (606), and mobile device 120 captures an image of window 140 (601).

Figure 7A:
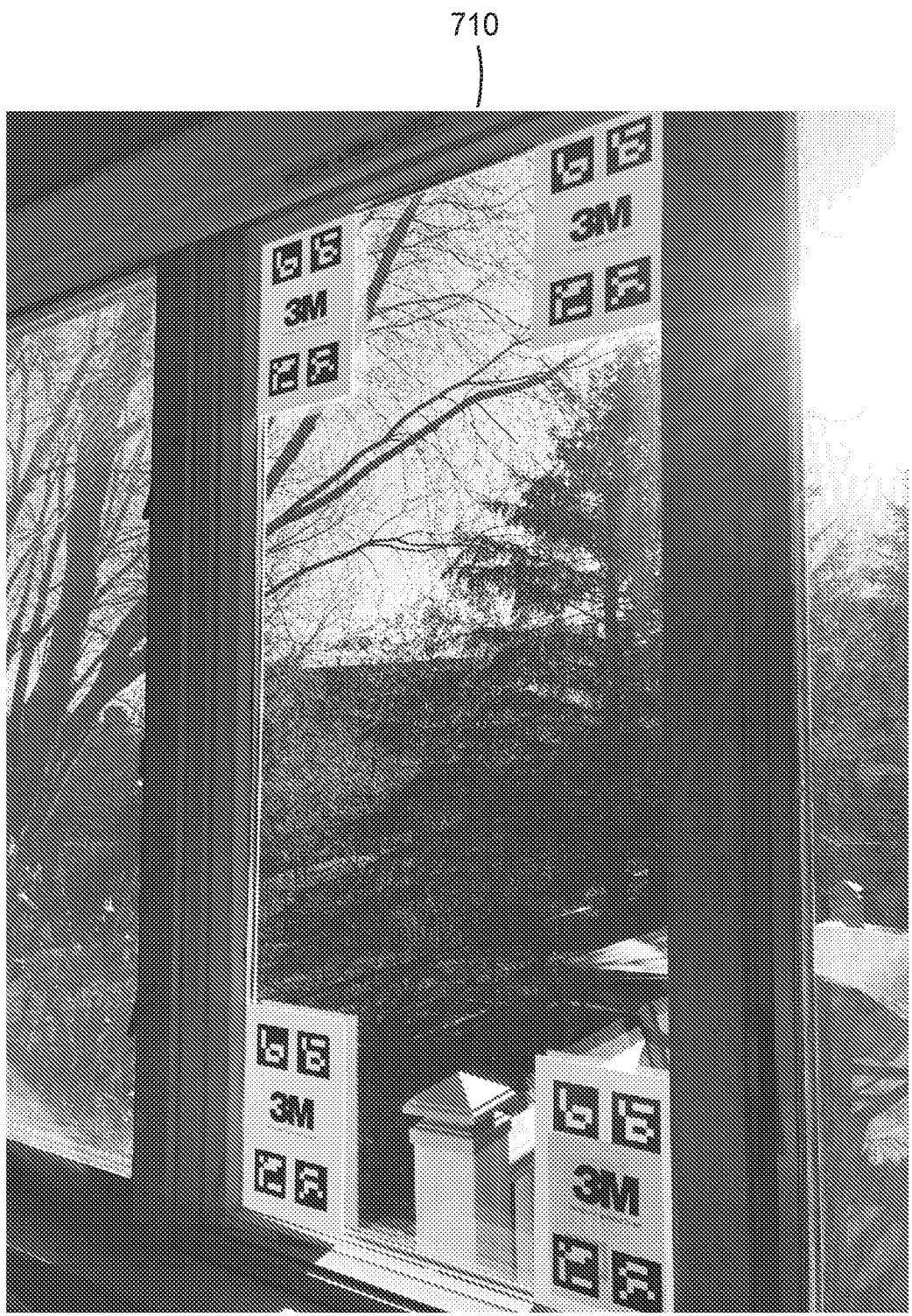
FIGS. 7a-7b depict an example captured image and an example corrected image, respectively, in accordance with aspects of this disclosure.
Figure 7B:
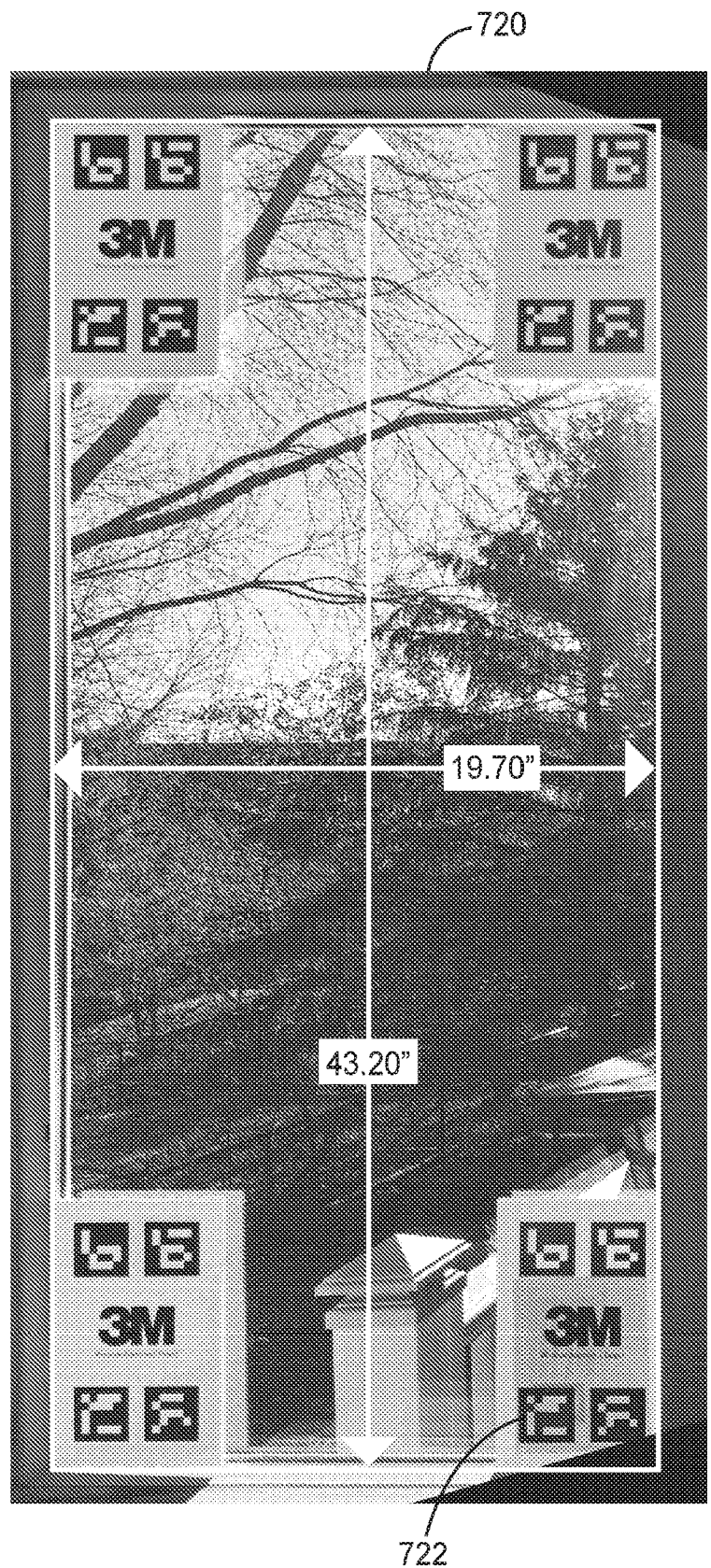

FIGS. 7a and 7b depict an example captured image 710 and an example corrected image 720, respectively, in accordance with aspects of this disclosure. Image 710 may represent an initial image captured by mobile device 120 of FIG. 1, the image including window 140 having a perspective distortion. Image 710 may be processed to create corrected image 720. Corrected image 720 displays the window and the plurality of removable cards as rectangles. Marker 722 may be a square marker including a unique pattern disposed in the center of the square. In one example, marker 720 is an ArUco marker. One corner, i.e., one correspondence point of marker 720, is occluded in corrected image 720. Therefore, the correspondence point of marker 722 occluded in corrected image 720 may not be used by a processor to calculate the height and the width of the window depicted in image 710 and corrected image 720.

The techniques described in this disclosure may be implemented, at least in part, in hardware, software, firmware or any combination thereof. For example, various aspects of the described techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals or carrier waves, although the term "computer-readable media" may include transient media such as signals, in addition to physical storage media.

Various examples have been described. These and other examples are within the scope of the following claims.

What is claimed is:

1. A system for determining dimensions of a film to be applied to a window, the system comprising:
   a plurality of removable cards for placement on the window, each of the plurality of removable cards having a plurality of visible correspondence points at pre-defined positions on the respective removable card;
   a mobile device having an image capture device, wherein the image capture device is configured to capture an image of the window and at least a subset of the plurality of removable cards placed on the window, wherein the subset of removable cards captured in the image have a set of correspondence points visible in the image; and
   a server configured to:
      detect a set of locations of each of the set of correspondence points visible in the image,
      calculate dimensions of the window based on the set of locations and the pre-defined positions of the correspondence points on the respective removable cards, wherein calculating the dimensions removes perspective distortions in the image, and
      output information indicative of the dimensions of the window, wherein the dimensions of the window are the dimensions of the film to be cut for the window.

2. The system of claim 1, wherein each removable card of the plurality of removable cards comprises:
   a card having a face,
   a group of reference markers located on the face, wherein each reference marker of the group of reference markers comprises a square having a unique pattern, and wherein a single correspondence point of the plurality of correspondence points is represented by a respective corner of the square, and
   one or more characters disposed on the face.

3. The system of claim 1, wherein at least one of the mobile device and the server are further configured to direct a film cutting device to cut the film according to the dimensions.

4. A server comprising:
   an interface module configured to receive an image of a window captured by a mobile device, the window having a plurality of removable cards placed on the window, wherein the plurality of removable cards collectively define a plurality of correspondence points, and wherein the plurality of correspondence points comprise at least a set of correspondence points visible in the image at pre-defined positions on the respective removable card; and
   a processor configured to:
      detect a set of locations of each of the set of correspondence points,
      calculate dimensions of the window based on the set of locations and the pre-defined positions of the correspondence points on the respective removable cards, wherein calculating the dimensions removes perspective distortions in the image, and
      output information indicative of the dimensions of the window via the interface module, wherein the dimensions of the window are dimensions of a film to be cut for the window.

5. The server of claim 4, wherein the processor is further configured to detect, in the image, the set of correspondence points.

6. The server of claim 4, wherein the processor is configured to calculate the dimensions of the window by mapping between the set of locations and the pre-defined positions of the correspondence points, and wherein mapping between the set of locations and the pre-defined positions removes perspective distortions in the image.

7. A method comprising:
   receiving, by a device, an image of a window captured by an image capture module of a mobile device, the window including a plurality of removable cards placed on the window, wherein the plurality of removable cards collectively define a plurality of correspondence points, and wherein the plurality of correspondence points comprise at least a set of correspondence points visible in the image at pre-defined positions on the respective removable card;
   detecting, by the device, a set of locations of each of the set of correspondence points;
   calculating, by the device, dimensions of the window based on the set of locations and the pre-defined positions of the correspondence points on the respective removable cards, wherein calculating the dimensions of the window removes perspective distortions from the image; and
   outputting, by the device, information indicative of the dimensions of the window, wherein the dimensions of the window are dimensions of a film to be cut for the window.

* * * * *